(12) United States Patent
Tanaka et al.

(10) Patent No.: US 9,676,290 B2
(45) Date of Patent: Jun. 13, 2017

(54) VEHICLE CONTROLLER

(71) Applicant: FUJI JUKOGYO KABUSHIKI KAISHA, Tokyo (JP)

(72) Inventors: Yuichi Tanaka, Tokyo (JP); Kazuki Furuta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/663,200

(22) Filed: Mar. 19, 2015

(65) Prior Publication Data
US 2015/0274029 A1 Oct. 1, 2015

(30) Foreign Application Priority Data

| Mar. 28, 2014 | (JP) | 2014-067719 |
| Jun. 26, 2014 | (JP) | 2014-130929 |
| Feb. 4, 2015 | (JP) | 2015-020659 |

(51) Int. Cl.
  *B60L 11/18* (2006.01)
  *B60L 7/18* (2006.01)
  *B60L 15/20* (2006.01)

(52) U.S. Cl.
  CPC ............ *B60L 11/1862* (2013.01); *B60L 7/18* (2013.01); *B60L 15/2045* (2013.01);
  (Continued)

(58) Field of Classification Search
  CPC ..... B60L 11/1862; B60L 7/18; B60L 15/2045
  See application file for complete search history.

(56) References Cited

U.S. PATENT DOCUMENTS

| 2009/0008172 A1 | 1/2009 | Aldrich, III et al. |
| 2011/0270477 A1 | 11/2011 | Ueki |
| 2013/0204472 A1 | 8/2013 | Pfefferl |

FOREIGN PATENT DOCUMENTS

| DE | 10303866 A1 | 8/2004 |
| DE | 102008030521 A1 | 1/2009 |

(Continued)

OTHER PUBLICATIONS

Office Action German Patent Application No. 10 2015 104 691.1 dated Aug. 11, 2016 with English translation.
(Continued)

*Primary Examiner* — Jerrah Edwards
*Assistant Examiner* — Kelly D Williams
(74) *Attorney, Agent, or Firm* — McDermott Will & Emery LLP

(57) ABSTRACT

A vehicle controller includes an electric motor connected to wheels, a power storage device connected to the electric motor, a charge/discharge controller that controls charge/discharge of the power storage device, a first traveling controller that controls the electric motor in accordance with a driver's operation, and a second traveling controller that controls the electric motor in accordance with a cruise function that automatically controls a vehicle speed. When the first traveling controller controls the electric motor, the charge/discharge controller controls charge/discharge power of the power storage device within a first charge/discharge range. When the second traveling controller controls the electric motor, the charge/discharge controller controls charge/discharge power of the power storage device within a second charge/discharge range that is wider than the first charge/discharge range.

2 Claims, 15 Drawing Sheets

(52) U.S. Cl.
CPC ........ *Y02T 10/6221* (2013.01); *Y02T 10/7005* (2013.01); *Y02T 10/7275* (2013.01); *Y10S 903/93* (2013.01)

(56) References Cited

FOREIGN PATENT DOCUMENTS

| | | |
|---|---|---|
| EP | 2387093 A1 | 11/2011 |
| JP | 2007-128778 A | 5/2007 |
| JP | 2008-279803 A | 11/2008 |
| JP | 2010-111182 A | 5/2010 |
| JP | 2012-240566 A | 12/2012 |
| JP | 2015-019521 A | 1/2015 |
| KR | 10-2012-0060631 A | 6/2012 |
| KR | 20120060631 A * | 6/2012 |

OTHER PUBLICATIONS

Office Action issued in corresponding Chinese Patent Application No. 201610380506.9, dated Feb. 24, 2017.

\* cited by examiner

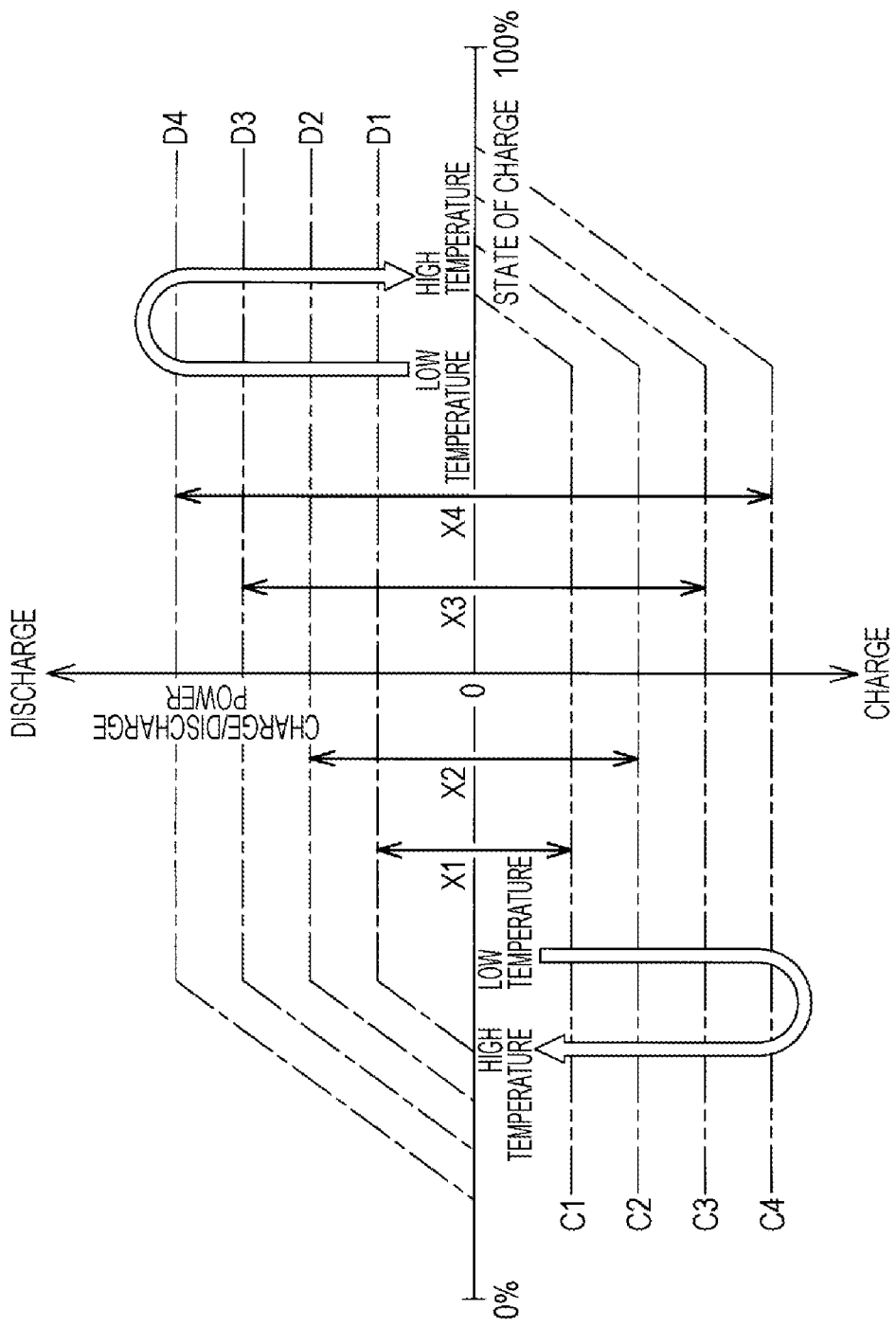

VEHICLE CONTROLLER

CROSS REFERENCES TO RELATED APPLICATIONS

The present application claims priority from Japanese Patent Applications Nos. 2014-067719 filed on Mar. 28, 2014, 2014-130929 filed on Jun. 26, 2014, and 2015-020659 filed on Feb. 4, 2015, the entire contents of which are hereby incorporated by reference.

BACKGROUND

1. Technical Field

The present invention relates to a vehicle controller provided with a power storage device.

2. Related Art

As a driving assistance system, a constant speed traveling system that maintains a prescribed vehicle speed or a cruise control system has been developed. Furthermore, there has been developed a cruise control system that uses a millimeter wave radar, infrared laser, stereo camera unit, monocular camera or the like to collect information on a preceding vehicle so as to cause the vehicle with the system to follow the preceding vehicle. Such cruise control systems are used in electric vehicles and hybrid vehicles that use one or more electric motors for propulsion.

It is desirable that the hybrid vehicles increase their motor traveling ranges within which they are capable of running on only an electric motor in order to actively switch off an engine for enhanced fuel economy. For this purpose, a hybrid vehicle has been proposed that, when approaching a preceding vehicle, predicts that the driver does not make a request for acceleration, and lifts restrictions on electric motor torque to increase the motor traveling range (see Japanese Unexamined Patent Application Publication (JP-A) No. 2012-240566). In other words, under a driving condition in which no driver request for acceleration is predicted, the torque margin of the electric motor reserved for acceleration is reduced, while the electric motor output torque is raised, thereby expanding the motor traveling range.

There has also been developed a driving assistance system that uses a millimeter wave radar, infrared laser, stereo camera unit, monocular camera or the like to perform forward monitoring and, if a vehicle crash is predicted, automatically brakes the vehicle. Hybrid vehicles and electric vehicles are provided with a regenerative braking system that enables regeneration of the electric motor. However, the braking force provided by the regenerative braking system is limited by the battery's capacity to store electricity, making it impossible to increase the braking force depending on the state of charge or temperature of the battery. In addition, regenerative electric power provided in conjunction with regenerative braking is supplied to the battery, which may pose a risk of the battery overcharging depending on the state of charge or temperature of the battery. To solve this concern, a hybrid vehicle has been proposed that, if there is a risk of the battery overcharging, causes the regenerative electric power provided in conjunction with regenerative braking to be consumed by other electric motors to avoid battery overcharging (JP-A No. 2010-111182).

Even if electric motor torque margin is reduced as described in JP-A No. 2012-240566, the performance of a battery or capacitor as a power storage device cannot be optimized, which may result in restrictions on a motor traveling range. In other words, since the charge/discharge range available to the power storage device may be narrowed by temperature conditions and state of charge, just increasing electric motor output torque may limit the motor traveling range. In addition, when an attempt is made to set the charge/discharge range for the power storage device, the charge/discharge range must be narrowed in consideration of an overshoot or undershoot associated with charge/discharge in order to prevent the power storage device from being overcharged or over-discharged. As a result, the performance of the power storage device cannot be optimized, making it difficult to expand the motor traveling range. In hybrid vehicles as well as electric vehicles, optimization of the power storage device's performance is essential to reduce electric vehicle power consumption.

With the automatic brake control for the aforementioned driving assistance system, it is important to increase braking force quickly and strongly if there is determined to be a risk of a vehicle crash. In other words, it is important to increase the braking force of the regenerative brake under automatic brake control. However, as described above, since the braking force of the regenerative brake is limited by the capacity of the battery to store electricity, the performance of the power storage device cannot be optimized depending on battery state of charge or temperature, making it difficult to increase braking force. In addition, from the viewpoint of the automatic brake control, it is necessary to optimize the performance of the power storage device.

SUMMARY OF THE INVENTION

Accordingly, it is an object of the present invention to optimize the performance of a power storage device.

An aspect of the present invention provides a vehicle controller including an electric motor that is configured to be connected to at least one wheel, an power storage device that is connected to the electric motor, a charge/discharge controller that controls the charge/discharge of the power storage device, a first traveling controller that controls the electric motor in accordance with a driver's operation, and a second traveling controller that controls the electric motor in accordance with a cruise function that automatically controls a vehicle speed. When the first traveling controller controls the electric motor, the charge/discharge controller controls charge/discharge power of the power storage device within a first charge/discharge range. When the second traveling controller controls the electric motor, the charge/discharge controller controls charge/discharge power of the power storage device within a second charge/discharge range that is wider than the first charge/discharge range.

Another aspect of the present invention provides a vehicle controller is a vehicle controller that automatically controls the vehicle in accordance with information on an object ahead of the vehicle. The vehicle controller includes an electric motor that is connected to at least one wheel, a power storage device that is configured to be connected to the electric motor, a determiner that, based on the information on the object, determines whether or not a braking situation in which a distance to the object falls below a predetermined distance has occurred, a power storage device controller that, when the braking situation is determined, extends a power limit value for a charge side in the power storage device, and a motor controller that regenerates the motor when the braking situation is determined.

BRIEF DESCRIPTION OF THE DRAWINGS

FIG. 4 is a schematic view illustrating a limit value for a charge side and a limit value for a discharge side.

DETAILED DESCRIPTION

First Example

Figure 1:
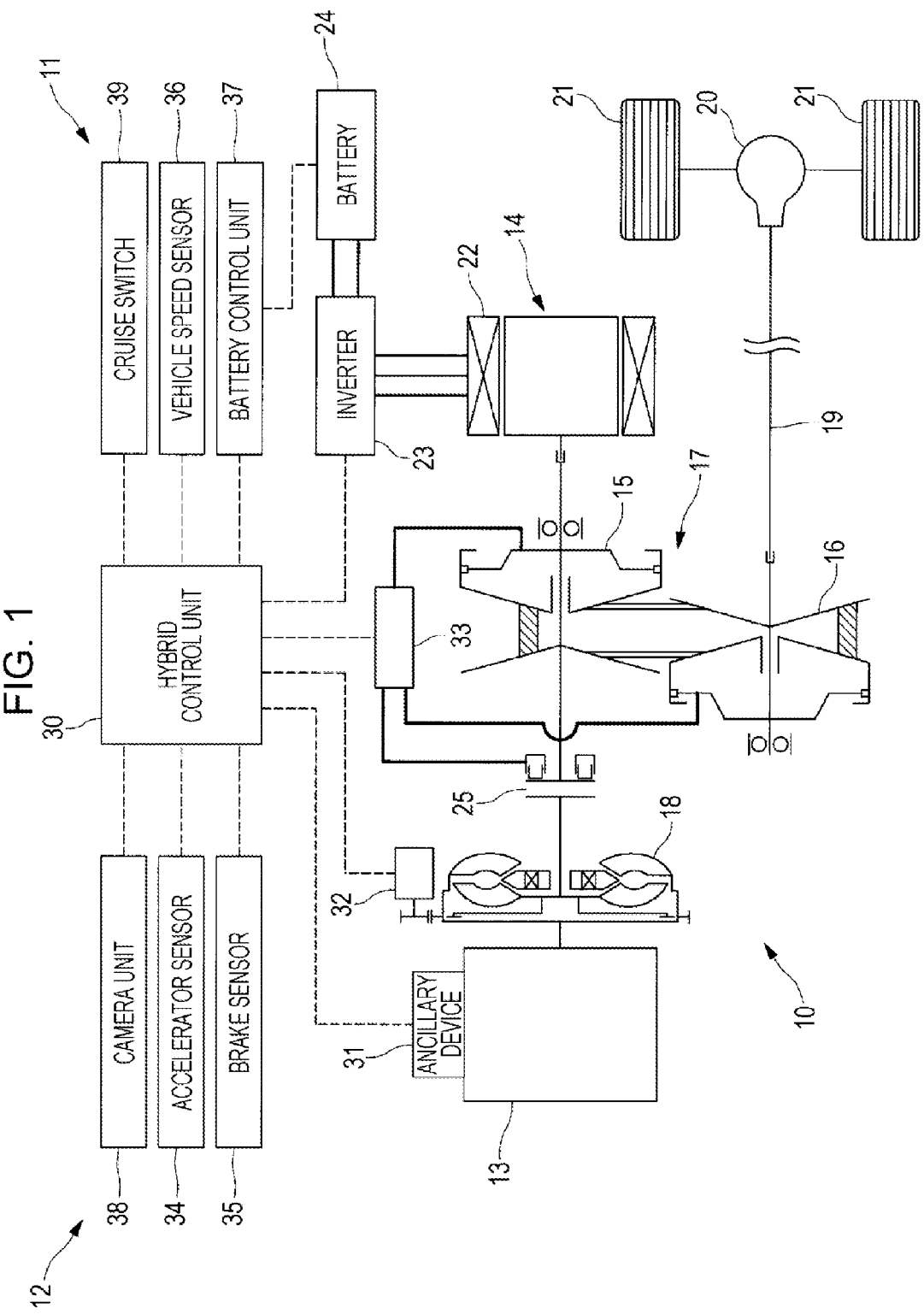
FIG. 1 is a diagram illustrating a vehicle controller according to a first example of the present invention.

A first example of the present invention will be described below in detail with reference to the attached drawings. FIG. 1 is a diagram illustrating a vehicle controller 12 according to the first example of the present invention. As illustrated in FIG. 1, a hybrid vehicle is provided with a power unit 10 and a control system 11. The vehicle controller 12 according to the first example of the present invention is configured with the power unit 10 and the control system 11.

The power unit 10 has an engine 13 and a motor generator (electric motor) 14 as power sources. The power unit 10 is also provided with a continuously variable transmission 17 including a primary pulley 15 and a secondary pulley 16. The primary pulley 15 is connected at one end thereof to the engine 13 through a torque converter 18 and is connected at the other end thereof to the motor generator 14. The secondary pulley 16 is connected to wheels 21 through an output shaft 19 and a differential mechanism 20. Furthermore, a stator 22 of the motor generator 14 is connected to a battery (power storage device) 24 through an inverter 23. In this manner, the motor generator 14 is connected mechanically to the wheels 21 and electrically to the battery 24.

A clutch 25 that is switchable between engagement and disengagement states is provided between the torque converter 18 and the primary pulley 15. When a traveling mode is set to a motor traveling mode, the clutch 25 is switched to the disengagement state in which the primary pulley 15 and the engine 13 are disengaged from each other. In the motor traveling mode, the engine 13 is shut down, while the motor generator 14 is activated to use motor power to drive the wheels 21. In contrast, when the traveling mode is set to a parallel traveling mode, the clutch 25 is switched to the engagement state in which the primary pulley 15 and the engine 13 are engaged with each other. In the parallel traveling mode, the engine 13 and the motor generator 14 are activated to use engine power and motor power to drive the wheels 21.

Figure 2:
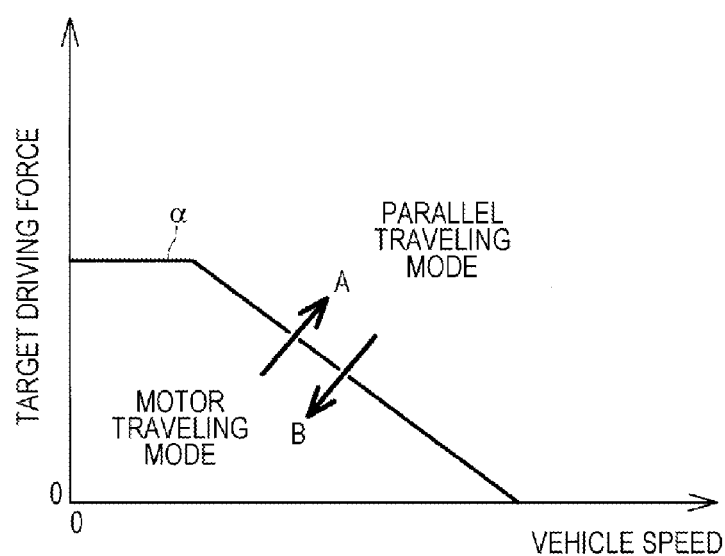
FIG. 2 is a mode map illustrating a region where a motor traveling mode is set and another region where a parallel traveling mode is set.

FIG. 2 is a mode map illustrating a region where the motor traveling mode is set and another region where the parallel traveling mode is set. As illustrated in FIG. 2, the mode map has a mode threshold α set on the basis of a target driving force and a vehicle speed. As illustrated by arrow A in FIG. 2, when the target driving force and the vehicle speed increase above the mode threshold α, the engine 13 is activated to switch the traveling mode from the motor traveling mode to the parallel traveling mode. In contrast, as illustrated by arrow B in FIG. 2, when the target driving force and the vehicle speed decrease below the mode threshold α, the engine 13 is deactivated to switch the traveling mode from the parallel traveling mode to the motor traveling mode.

As illustrated in FIG. 1, the control system 11 is provided with a hybrid control unit (hereinafter referred to as "control unit") 30 that controls the engine 13, the motor generator 14, the continuously variable transmission 17, the clutch 25 and the like. The control unit 30 outputs a control signal to ancillary device 31 including a throttle valve and an injector so as to control the torque and rotation of the engine 13. Also, the control unit 30 outputs a control signal to a starter motor 32 to control the cranking of the engine 13 during engine start-up. The control unit 30 outputs a control signal to the inverter 23 so as to control the torque and rotation of the motor generator 14. Furthermore, the control unit 30 outputs a control signal to a valve unit 33 that controls the supply of a hydraulic fluid to the continuously variable transmission 17 and the clutch 25 to control the operation of the continuously variable transmission 17 and the clutch 25. The control unit 30 is connected to an accelerator sensor 34 that detects the operation amount of an accelerator pedal (hereinafter referred to as "accelerator operation amount"), a brake sensor 35 that detects the operation amount of a brake pedal (hereinafter referred to as "brake operation amount"), a vehicle speed sensor 36 that detects a speed at which the vehicle is traveling, and the like. In addition, the control unit 30 receives data on a temperature level and a state of charge (SOC) of the battery 24 from a battery control unit 37. The control unit 30 includes a CPU that calculates control signals, ROM that stores a control program, arithmetic expressions and map data, and RAM that temporarily stores data.

The control system 11 also has a cruise control function (hereinafter referred to as "cruise function") that provides automatic vehicle speed control. The cruise function of the control system 11 includes a constant speed control function that maintains a vehicle speed at a constant level and a following control function that maintains a vehicle-to-vehicle distance from a preceding vehicle at a constant level. The control system 11 is provided with a camera unit 38 that takes an image ahead of the vehicle and a cruise switch 39 that is operable by a vehicle driver. The cruise switch 39 is used to activate or deactivate the cruise function and set a vehicle speed and a vehicle-to-vehicle distance that serves as the control targets of the cruise function. When the cruise switch 39 is switched to activate the cruise function, the control unit 30 makes checks information on a preceding vehicle on the basis of image information received from the camera unit 38. Pieces of the preceding vehicle information include the presence or absence of a preceding vehicle, vehicle-to-vehicle distance to the preceding vehicle, difference in speed from the preceding vehicle. The control unit 30 performs automatic vehicle-speed control to maintain the set vehicle speed when no preceding vehicle is present and to maintain the set vehicle-to-vehicle distance without exceeding the set vehicle speed when a preceding vehicle is present. Automatic vehicle-speed control is performed by controlling the engine 13, the motor generator 14, and the continuously variable transmission 17.

Figure 3:
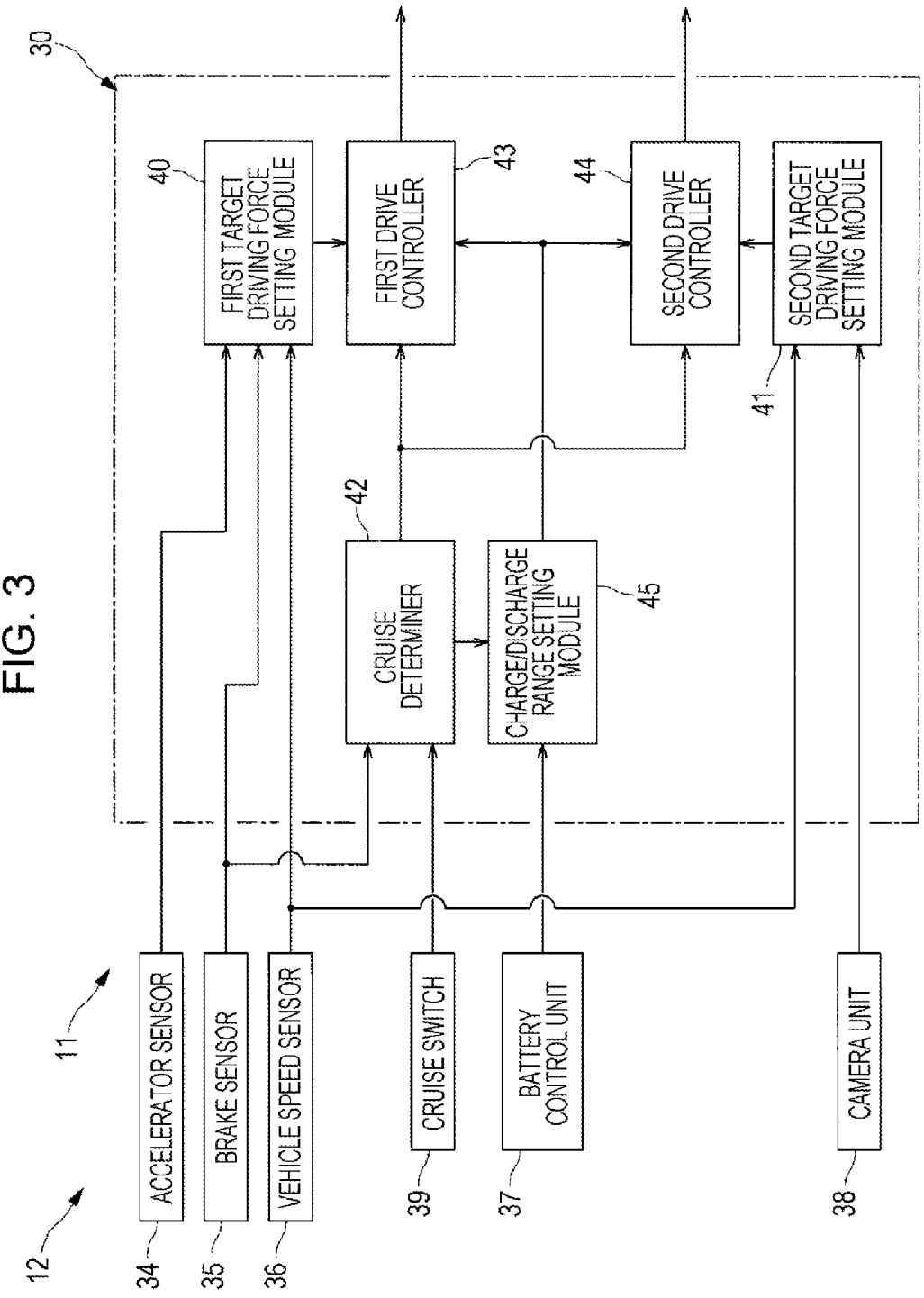
FIG. 3 is a block diagram illustrating some of functions provided by a control unit.

FIG. 3 is a block diagram illustrating some of the functions provided by the control unit 30. As described later, the control unit 30 functions as the first traveling controller, the second traveling controller, and the charge/discharge controller of the present invention in this example. As illustrated in FIG. 3, the control unit 30 has a first target driving force setting module 40 that sets a first target driving force. The first target driving force is a target driving force that is set on the basis of a driver's operation such as accelerator operation and braking operation and used during the period of normal traveling when the cruise function is deactivated. The control unit 30 has a second target driving force setting module 41 that sets a second target driving force. The second target driving force is a target driving force used during the period of cruise traveling when the cruise function is activated. The rate of change in the first target driving force that varies with the driver's operation is set greater than the rate of change in the second target driving force that varies in accordance with the cruise function. In other words, the upper limit of the rate of change is set higher during normal traveling, thereby allowing the first target driving force to be changed quickly. In contrast, the upper limit of the rate of change is set lower during cruise traveling, thereby allowing the second target driving force to be changed more slowly. The first target driving force setting module 40 sets the first target driving force by referencing a predetermined driving force map based on a vehicle speed and an accelerator operation amount. The second target driving force setting module 41 sets the second target driving force based on the set vehicle speed, the set vehicle-to-vehicle distance, an actual vehicle speed, an actual vehicle-to-vehicle distance and the like. During regenerative braking, the first target driving force setting module 40 sets the first target driving force by referencing a predetermined driving force map based on the vehicle speed and the brake operation amount.

The control unit 30 also has a cruise determiner 42 that determines whether or not the cruise function is activated. The cruise determiner 42 refers to the operation of the cruise switch 39 and the brake pedal to determine whether or not the cruise function is activated and outputs the results the determination to a first drive controller 43 and a second drive controller 44. For instance, the cruise determiner 42 determines normal traveling in which the cruise function is deactivated when the cruise switch 39 is turned off or when the brake pedal is depressed. The first drive controller 43 outputs a control signal to the inverter 23 and the ancillary device 31 and thereby controls the engine 13 and the motor generator 14 so as to control the wheels 21 are controlled with the first target driving force. In contrast, the cruise determiner 42 determines cruise traveling in which the cruise function is activated when the cruise switch 39 is turned on or when the brake pedal is not depressed. The second drive controller 44 outputs a control signal to a control signal to the inverter 23 and the ancillary device 31 and thereby controls the engine 13 and the motor generator 14 so as to control the wheels 21 are controlled with the second target driving force.

Furthermore, the control unit 30 has a charge/discharge range setting module 45 that sets a range within which the battery 24 is charged/discharged. The charge/discharge range setting module 45 sets a charge/discharge range based on the temperature and the state of charge (SOC) of the battery 24. FIG. 4 is a schematic view illustrating a limit value for a charge side and a limit value for a discharge side. As illustrated by the white arrows in FIG. 4, the battery 24 at high and low temperature has discharge limit value D1 and charge limit value C1 set low, while the battery 24 at normal temperature has a discharge limit value D4 and a charge limit value C4 set high. In other words, the battery 24 at high and low temperature has a narrow charge/discharge range X1 set by the limit values D1 and C1. When the temperature of the battery 24 increases from low to normal levels or when the temperature of the battery 24 decreases from high to normal levels, the charge/discharge range gradually expands to a charge/discharge range X2, charge/discharge range X3, and charge/discharge range X4, in this order. When the state of charge (SOC) approaches 0%, the discharge limit values D1 to D4 are set at lower levels approaching 0. In contrast, when the state of charge (SOC) approaches 100%, the charge limit values C1 to C4 are set at lower levels approaching 0. For the battery 24 at low temperature, setting of the discharge limit values D1 to D4 and the charge limit values C1 to C4 takes into consideration the protection of various electronic components, because the voltage varies significantly in response to a change in charge/discharge power. For the battery 24 at high temperature, setting of the discharge limit values D1 to D4 and the charge limit values C1 to C4 takes into consideration the protection of the battery 24 from deterioration.

Figure 5A:
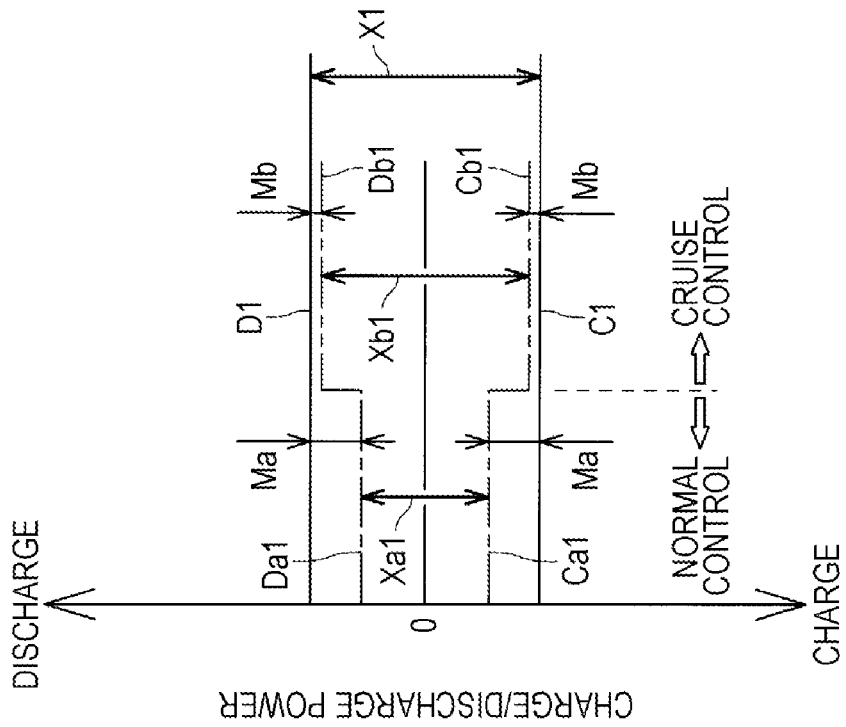
FIG. 5A is a schematic view illustrating a charge/discharge range applicable at normal temperature.
Figure 5B:
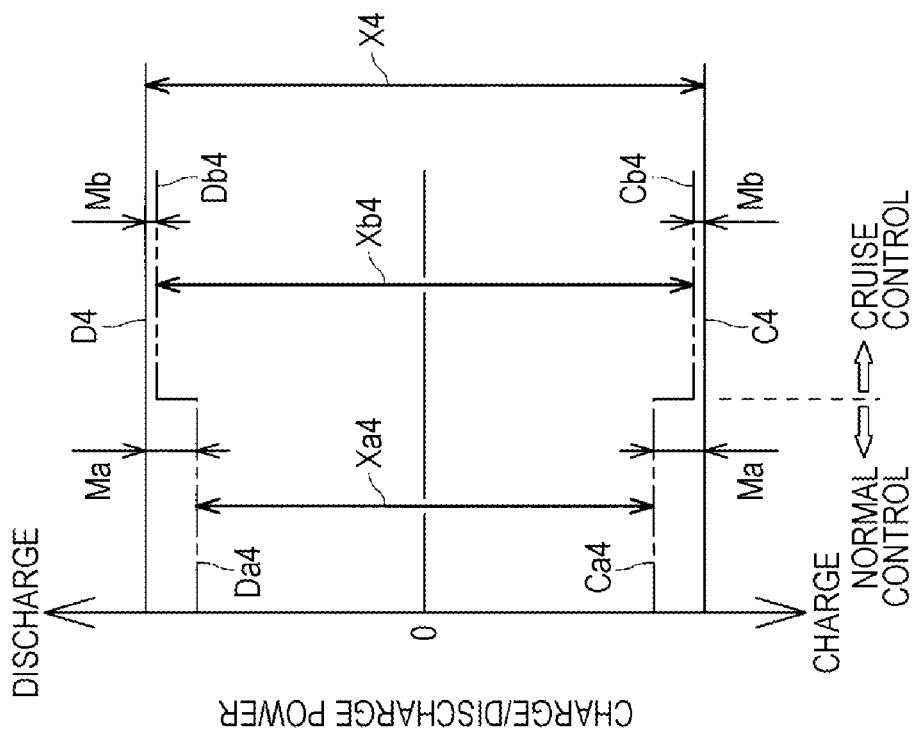
FIG. 5B is a schematic view illustrating a charge/discharge range applicable at high and low temperature.

In order to prevent overcharging or over-discharging of the battery 24, the charge/discharge range setting module 45 corrects the size of the charge/discharge range according to the presence or absence of the cruise control by using the afore-mentioned charge/discharge ranges X1 to X4 as reference. FIG. 5A is a schematic view illustrating a charge/discharge range applicable at normal temperature. FIG. 5B is a schematic view illustrating a charge/discharge range applicable at high and low temperature. As illustrated in FIG. 5A, under normal control at normal temperature, a first discharge limit value Da4 is set below a discharge limit value D4 by a margin Ma, while a first charge limit value Ca4 is set below a charge limit value C4 by a margin Ma. In other words, under normal control at normal temperature, a first charge/discharge range Xa4 defined by the first discharge limit value Da4 and the first charge limit value Ca4 is set as a charge/discharge range within which the battery 24 is subjected to charge/discharge control. Under cruise control at normal temperature, a second discharge limit value Db4 is set below the discharge limit value D4 by a margin Mb, while a second charge limit value Cb4 is set below a charge limit value C4 by a margin Mb. As described above, the cruise control uses the margin Mb that is smaller than the margin Ma for the normal control. In other words, under cruise control at normal temperature, a second charge/discharge range Xb4 defined by the second discharge limit value Db4 which is greater than the first discharge limit value Da4 on the discharge side and the second charge limit value Cb4 which is greater than the first charge limit value Ca4 on the charge side is set as the charge/discharge range within which the battery 24 is subjected to charge/discharge control.

As illustrated in FIG. 5B, under normal control at high and low temperature, a first discharge limit value Da1 is set Ma below a discharge limit value D1 by a margin, while a first charge limit value Ca1 is set below a charge limit value C1 by a margin Ma. In other words, under normal control at high and low temperature, a first charge/discharge range Xa1 defined by the first discharge limit value Da1 and the first charge limit value Ca1 is set as the charge/discharge range within which the battery 24 is subjected to charge/discharge control. Under cruise control at high and low temperature, a second discharge limit value Db1 is set below the discharge limit value D1 by a margin Mb, while a second charge limit value Cb1 is set below a charge limit value C1 by a margin Mb. As described above, the cruise control uses the margin Mb that is smaller than the margin Ma for the normal control. In other words, under cruise control at high and low temperature, a second charge/discharge range Xb1 defined by the second discharge limit value Db1 which is greater than the first discharge limit value Da1 on the discharge side and a second charge limit value Cb1 which is greater than the first charge limit value Ca1 on the charge side is set as the charge/discharge range within which the battery 24 is subjected to charge/discharge control.

As described above, under normal control in which the cruise function is deactivated, a charge/discharge output of the battery 24, namely, its charge/discharge power is subjected to control in the first charge/discharge ranges Xa1 and Xa4. In contrast, under cruise control in which the cruise function is activated, the charge/discharge power of the battery 24 is subjected to control in the second charge/discharge ranges Xb1 and Xb4 which are wider than the first charge/discharge ranges Xa1 and Xa4. In other words, under normal control, charge/discharge power is subjected to control in the first charge/discharge ranges Xa1 and Xa4 in which the greater margin Ma is set, while, under cruise function, charge/discharge power is subjected to control in the second charge/discharge ranges Xb1, Xb4 in which the smaller margin Mb is set. As described above, since the charge/discharge power of the battery 24 is subject to rapid change under normal control in which the torque of the motor generator 14 changes rapidly depending on the driver's operation, charge/discharge power is subjected to control in the first charge/discharge ranges Xa1 and Xa4 having the greater margin Ma set. In contrast, since the charge/discharge power of the battery 24 is subject to gradual change under cruise control in which the torque of the motor generator 14 changes gradually, charge/discharge power is subjected to control in the second charge/discharge ranges Xb1 and Xb4 having the smaller margin Mb set. As a result, the performance of the battery 24 can be optimized, while overcharging or over-discharging of the battery 24 is prevented.

Figure 6:
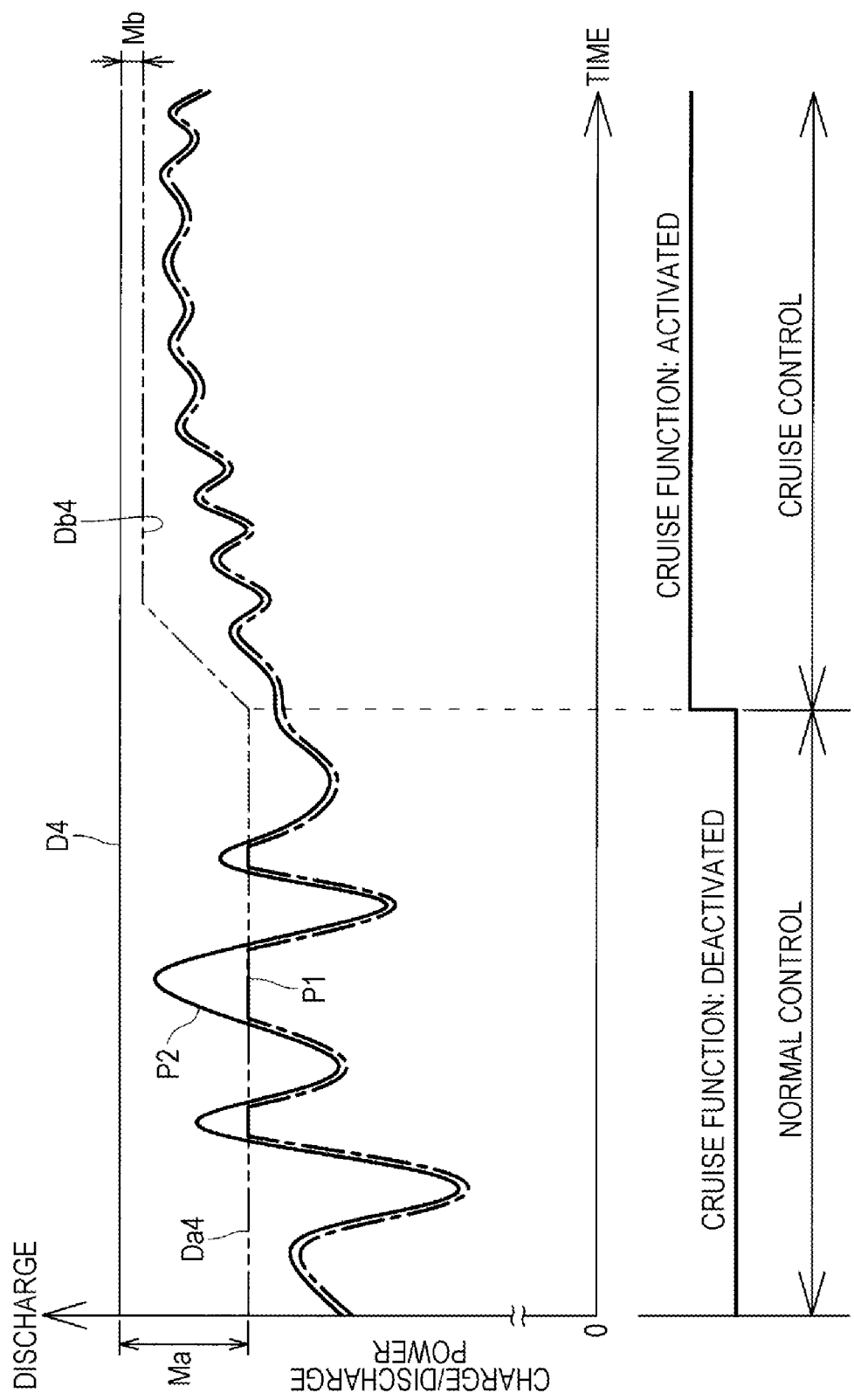
FIG. 6 is a schematic view illustrating a change in charge/discharge power of a battery on a discharge side.
Figure 7:
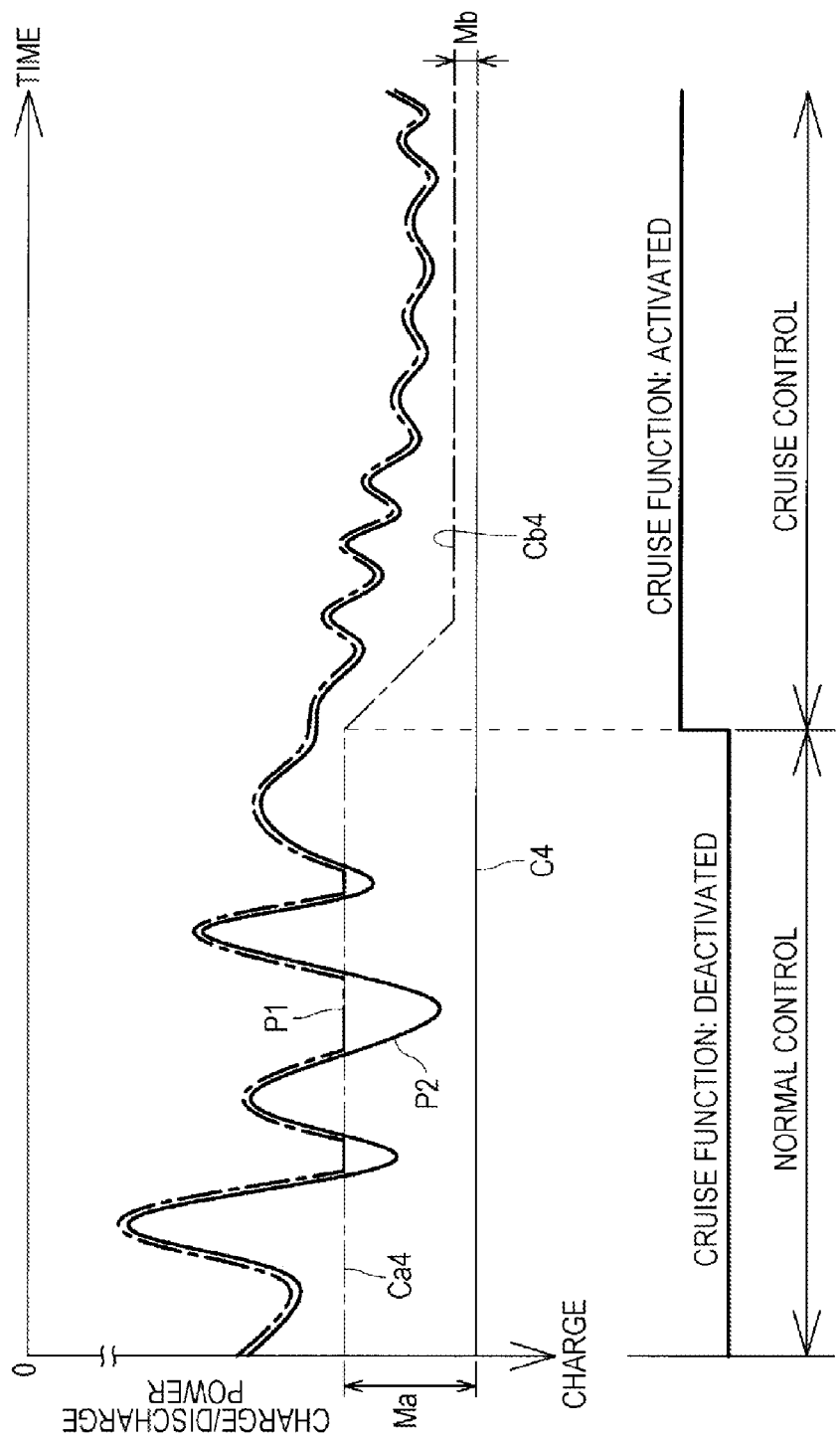
FIG. 7 is a schematic view illustrating a change in charge/discharge power of a battery on a charge side.

FIG. 6 is a schematic view illustrating a change in the charge/discharge power of the battery 24 in the discharge side. FIG. 7 is a schematic view illustrating a change in charge/discharge power of the battery 24 in the charge side. FIGS. 6 and 7 illustrate examples of the charge/discharge range at normal temperature. As illustrated in FIG. 6, for the normal control under which the cruise function is deactivated, the first discharge limit value Da4 has the greater margin Ma extending to the discharge limit value D4. As a result, even if the control target P1 for the charge/discharge power rises sharply on the discharge side after the accelerator pedal is depressed to a large degree, the first discharge limit value Da4 places restrictions on the control target P1 at an earlier stage. In other words, even if the charge/discharge power P2 from the battery 24 rises to levels in excess of the first discharge limit value Da4 leading to an overshoot, the charge/discharge power P2 can be suppressed so as not to reach the discharge limit value D4. This can prevent over-discharging of the battery 24. For the cruise control under which the cruise function is activated, the second discharge limit value Db4 has the smaller margin Mb extending to the discharge limit value D4. In other words, the cruise control under which the control target P1 for the charge/discharge power is subjected to gradual change causes no excessive overshoot of the charge/discharge power P2, which allows the charge/discharge power P2 to be moved close to the discharge limit value D4. With this arrangement, the performance of the battery 24 can be optimized, thereby improving fuel economy of a hybrid vehicle.

As illustrated in FIG. 7, for normal control under which the cruise function is deactivated, the first charge limit value Ca4 has the greater margin Ma extending to the charge limit value C4. With this arrangement, even if the control target P1 for the charge/discharge power rises sharply on the charge side after the accelerator pedal is depressed to a large degree, the first charge limit value Ca4 places restrictions on the control target P1 at an earlier stage. In other words, even if charge/discharge power P2 from the battery 24 drops to levels below the first charge limit value Ca4 leading to an undershoot, the charge/discharge power P2 can be suppressed so as not to reach the charge limit value C4. This can prevent overcharging of the battery 24. For cruise control under which the cruise function is activated, the second charge limit value Cb4 has the smaller margin Mb extending to the charge limit value C4. In other words, the cruise control under which the control target P1 for the charge/discharge power is subjected to gradual change causes no excessive undershoot of the charge/discharge power P2, which allows the charge/discharge power P2 to be moved close to the charge limit value C4. As a result, the performance of the battery 24 can be optimized, thereby improving fuel economy of the hybrid vehicle.

As described so far, under normal control in which the cruise function is deactivated, the charge/discharge power of the battery 24 is subjected to control in the first charge/discharge range, while, under cruise control in which the cruise function is activated, the charge/discharge of the battery 24 is subjected to control in the second charge/discharge range that is wider than the first charge/discharge range. As described above, the performance of the battery 24 can be optimized by changing the control range of the battery 24 according to the driving condition. In other words, the performance of the battery 24 can be optimized while overcharging or over-discharging of the battery 24 is suppressed. Since the performance of the battery 24 can be optimized as described above, restrictions on the motor traveling mode and restrictions on the amount of motor regeneration due to temperature conditions can be reduced, thereby allowing improvement of hybrid vehicle's fuel economy. In particular, although, as illustrated in FIG. 5B, the battery 24 at high and low temperature places severe restrictions on the motor traveling mode and the amount of motor regeneration due to the narrow charge/discharge range X1 as a reference, the motor generator 14 can be more frequently used by expanding the charge/discharge range from Xa1 to Xb1 under cruise control. In addition, since the battery 24 at low temperature results in more frequent use of the motor generator 14, the battery 24 can be warmed at an earlier stage as a result of the more frequent charging and discharging. In other words, since the warmer battery 24 results in a wider charge/discharge range, the motor generator 14 can be used more frequently.

During the process where the cruise control is switched to the normal control, namely, the charge/discharge range is narrowed, the rate of change in the first target driving force according to the driver's operation is preferably suppressed to avoid overcharging or over-discharging of the battery 24. For instance, as illustrated in FIG. 6, the charge/discharge power P2 may exceed the first discharge limit value Da4 in some cases under cruise control. If this excess occurs, the rapid change to the control target P1 causes the charge/discharge power P2 to exceed the discharge limit value D4. For this reason, during the process where the charge/discharge range is narrowed, the rate of change in the first target driving force is preferably restricted to suppress a rapid change to the control target P1.

Needless to say, the present invention is not limited to the foregoing example. Various modifications are conceivable within the scope of the present invention. In the above description, the vehicle controller 12 is applied to a hybrid vehicle, but the present invention is not limited to this. Alternatively, the vehicle controller 12 may be applied to an electric vehicle provided with only electric motors as a power source. The present invention, if applied to the electric vehicle, can maximize the performance of the battery 24, thereby allowing the fuel economy to be improved. Also, the control system 11 is provided with, as the cruise function, the constant-speed control function and the following control function, but not limited to this. The control system 11 may be provided with, as the cruise function, the constant-speed function only or the following control function only. In the above description, the charge and discharge sides use the same margins Ma and Mb, but the present invention is not limited to this. Alternatively, the charge and discharge sides may use different margins. In addition, although the same margin Ma is applied to the normal control and the same margin Mb is applied to the cruise control even if the charge/discharge ranges X1 and X4 as a reference is changed, but the present invention is not limited to this.
Alternatively, the margins may be changed according to the charge/discharge range as a reference.

In the above description, the battery 24 is used as a power storage device, but not limited to this. A capacitor may be used as a power storage device. In addition, preceding-vehicle information is acquired with the camera unit 38 in the above description. The camera unit 38 may be a stereo camera system provided with a plurality of cameras or a monocular camera provided with one camera.
Alternatively, preceding-vehicle information may be acquired with a millimeter wave radar or infrared laser. The power unit mounted on the hybrid vehicle is not limited to the power unit 10 illustrated in the figures. For instance, the power unit 10 illustrated in FIG. 1 is a power unit provided with one motor generator 14, but the present invention is not limited to this. The power unit provided with two or more motor generators 14 may be used.

Second Example

Figure 8:
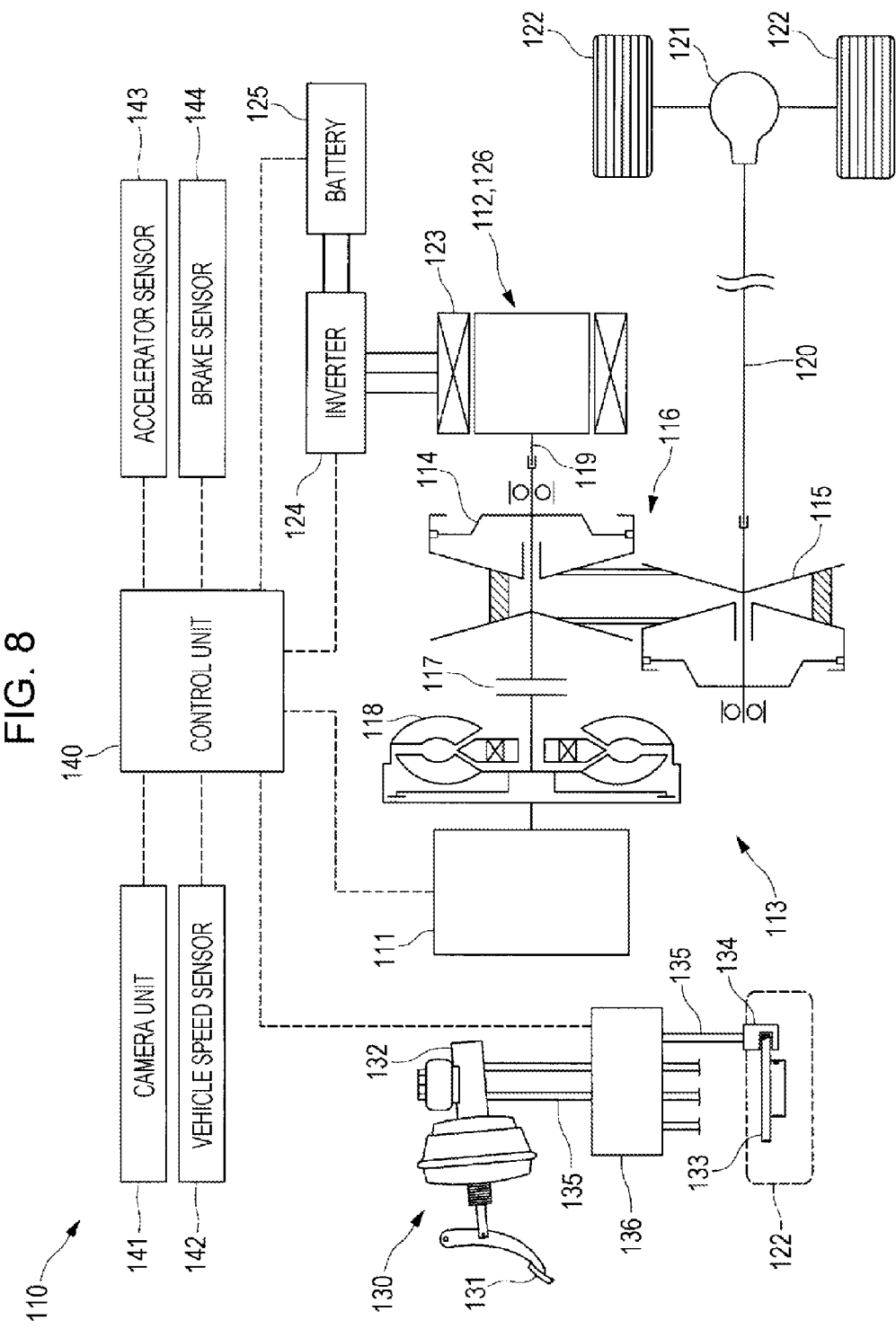
FIG. 8 is a diagram illustrating a vehicle controller according to a second example of the present invention.

A second example of the present invention will be described below in detail with reference to the attached drawings. FIG. 8 is a diagram illustrating a vehicle controller 110 according to a second example of the present invention. As illustrated in FIG. 8, the vehicle controller 110 is provided with a power unit 113 having an engine 111 and a motor generator (electric motor) 112. The power unit 113 is provided with a continuously variable transmission 116 including a primary pulley 114 and a secondary pulley 115. The primary pulley 114 is connected at one end thereof to the engine 111 through a clutch 117 and a torque converter 118 and is connected at the other end thereof to the motor generator 112 through a motor shaft 119. The secondary pulley 115 is connected to wheels 122 through an output shaft 120 and a differential mechanism 121. Furthermore, a stator 123 of the motor generator 112 is connected to a battery (power storage device) 125 through an inverter 124. As described above, the motor generator 112 is connected mechanically to the wheels 122 and electrically to the battery 125. A regenerative brake 126 includes the motor generator 112, and the wheels 122 can be braked with regenerative torque from the motor generator 112.

The vehicle controller 110 is provided with a hydraulic brake 130 that brakes the wheels 122. The hydraulic brake 130 is provided with a brake pedal 131 that is configured to be operated by a vehicle driver and a master cylinder 132 that generates brake fluid pressure according to the operation amount of the brake pedal 131. Also, the hydraulic brake 130 is provided with a disc rotor 133 mounted on the wheels 122 and a caliper 134 that brakes the disc rotors 133. The master cylinder 132 and the caliper 134 are connected to each other through a brake pipe 135 through which a brake fluid flows. Furthermore, the hydraulic brake 130 is provided with a brake actuator 136 that controls brake fluid pressure. The brake actuator 136 includes an electric pump, an accumulator, and an electromagnetic valve and the like, all of which are not illustrated. The brake actuator 136 has a function to adjust brake fluid pressure under an automatic brake control to be described later.

The vehicle controller 110 has a control unit 140 that controls the engine 111, the motor generator 112, and the brake actuator 136 and the like. The control unit 140 is connected with a camera unit 141 that takes an image ahead of the vehicle, a vehicle speed sensor 142 that detects a vehicle speed, an accelerator sensor 143 that detects the operation amount of an accelerator pedal, a brake sensor 144 that detects the operation amount of the brake pedal 131. Also, the control unit 140 receives temperature levels, state of charge (SOC), current levels, and voltage levels of the battery 125 from a sensor (not illustrated) mounted on the battery 125. Based on detection signals from various sensors, the control unit 140 determines the state of the vehicle and outputs a control signal to the engine 111, the motor generator 112, and the brake actuator 136 and the like. The control unit 140 is includes a CPU that performs calculation of control signals, ROM that stores programs and data, and RAM that temporarily stores data.

Figure 9:
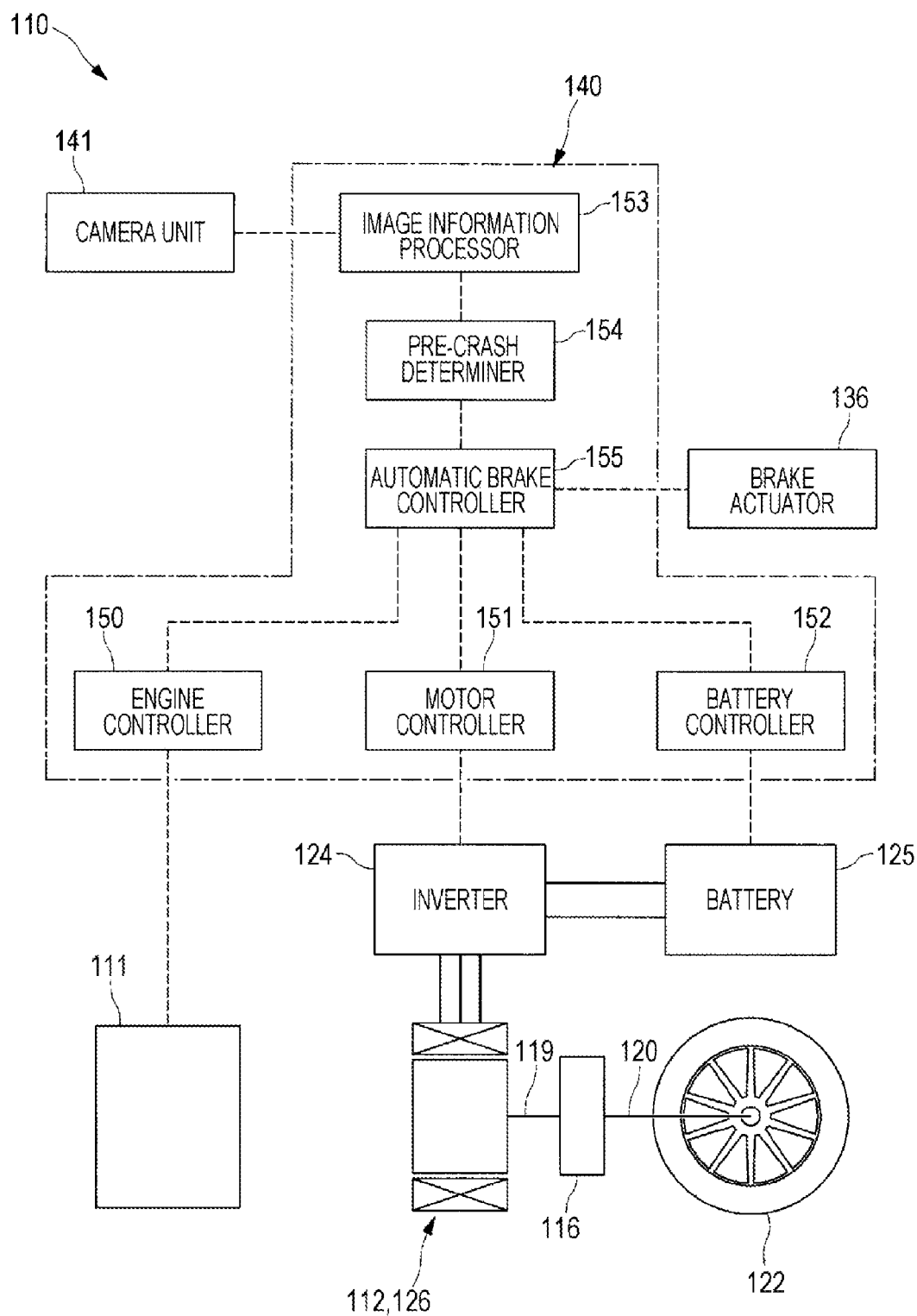
FIG. 9 is a diagram illustrating part of functions provided by a control unit.

Next, the automatic brake control that automatically brakes the vehicle is described below. FIG. 9 is a diagram illustrating part of functions provided by the control unit 140. As illustrated in FIG. 9, the control unit 140 has an engine controller 150, a motor controller 151, and a battery controller 152. The control unit 140 also has an image information processor 153, a pre-crash determiner 154, and an automatic brake controller 155. The control unit 140 provided with these serves as the brake determiner, the power storage device controller, and the motor controller of the present invention in this example, as described later.

The image information processor 153 processes image information from the camera unit 141 to detect the information (object information) on a preceding vehicle ahead of the vehicle. Pieces of the preceding-vehicle information processed by the image information processor 153 include a vehicle-to-vehicle distance from the preceding vehicle (distance from the object) and a difference in speed from the preceding vehicle (speed difference from the object) and the like. The pre-crash determiner 154 determines, based on the vehicle-to-vehicle distance and speed difference as the preceding-vehicle information, whether or not an automatic braking situation (braking situation) where the vehicle-to-vehicle distance to the preceding vehicle is less than a predetermined distance has occurred, namely, a braking situation where the automatic brake control is required has occurred.

Figure 10:
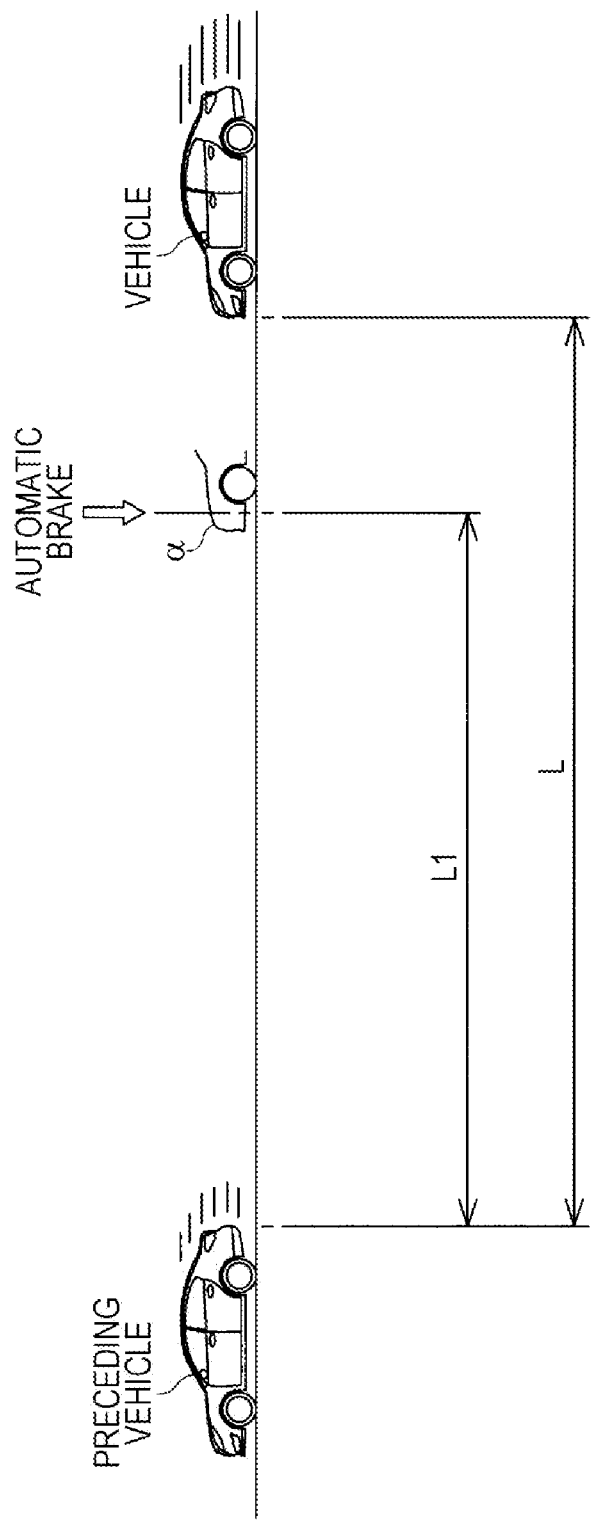
FIG. 10 is an illustration depicting an automatic braking situation.

FIG. 10 is an illustration depicting the automatic braking situation. As illustrated by an symbol α in FIG. 10, when the vehicle-to-vehicle distance L between the vehicle and a preceding vehicle is less than a predetermined distance L1, the pre-crash determiner 154 determines that the automatic braking situation where the automatic brake control is required. When there is a large difference in speed between the vehicle and a preceding vehicle, in other words, the vehicle is approaching the preceding vehicle at a high speed, the predetermined distance L1 is set high. In contrast, when there is a small difference in speed between the vehicle and a preceding vehicle, in other words, the vehicle is approaching the preceding vehicle at a low speed, the predetermined distance L1 is set low. The predetermined distance L1 may be varied continuously according to a speed difference or may be varied in a step-by-step manner according to a speed difference.

As described above, the pre-crash determiner 154 determines the automatic braking situation, the automatic brake controller 155 sets a target deceleration based on the vehicle-to-vehicle distance and speed difference. Then, the automatic brake controller 155 outputs a control signal to the engine controller 150, the motor controller 151, and the brake actuator 136 so as to decelerate the vehicle at the target deceleration. Specifically, in order to avoid a crash to the preceding vehicle, engine torque is reduced, regenerative torque of the motor generator 112 is raised, and braking force of the hydraulic brake 130 is increased. In this manner, when the automatic braking situation is determined, the motor controller 151 of the control unit 140 puts the motor generator 112 in generative mode in order for the regenerative brake 126 to raise braking force.

It is important to initiate strong braking force quickly, requiring highly responsive braking force of the regenerative brake 126 to be increased. However, the magnitude of braking force from the regenerative brake 126, namely, the magnitude of regenerative torque from the motor generator 112 is limited by a power limit value for the charge side that is set in the battery 125 (hereinafter referred to as charging limit value). This makes it difficult to allow the regenerative brake 126 to fully function, depending on the state of charge and temperature of the battery 125. To overcome the difficulty, the automatic brake controller 155 outputs a control signal to the battery controller 152 as well in order to expand the charge limit value in conjunction with the automatic brake control.

Figure 11:
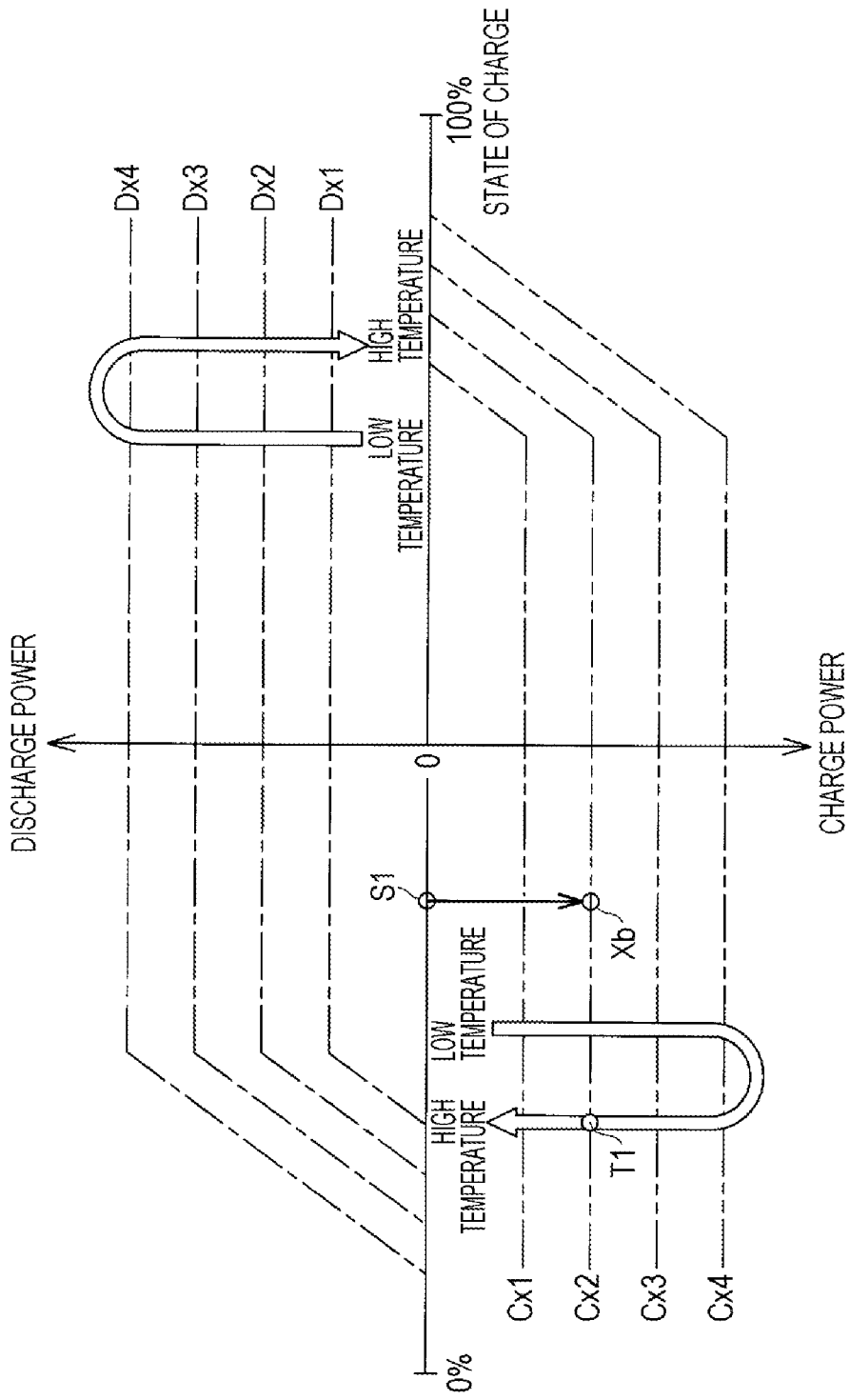
FIG. 11 is a schematic view illustrating a charge/discharge range of a battery.

Next, descriptions of a charge/discharge range of the battery 125 are followed by descriptions of an extension control of the charge limit value. FIG. 11 is a schematic view illustrating the charge/discharge range of the battery 125. FIG. 11 illustrates the discharge side of the battery 125 in its upper half and the charge side in its lower half. In descriptions below, as is the case with the charge limit value, a power limit for the discharge side is referred to as discharge limit value. As illustrated by the white arrows in FIG. 11, the battery 125 at high and low temperature has discharge a limit value Dx1 and a charge limit value Cx1 set low, while the battery 125 at normal temperature has discharge a limit value Dx4 and a charge limit value Cx4 set high. In other words, the battery 125 at high and low temperature has a narrow charge/discharge range, while the battery 125 at normal temperature has a wider charge/discharge range. As the state of charge becomes closer to 0%, the discharge limit values Dx1 to Dx4 are set at lower levels approaching 0. In contrast, as the state of charge becomes closer to 100%, the charge limit values Cx1 to Cx4 are set at lower levels approaching 0.

For the battery 125 at low temperature, since the voltage significantly varies in response to a change in charge/discharge power, the discharge limit values and the charge limit values are set low, for the protection of various electronic components. For the battery 24 at high temperature, the discharge limit value and the charge limit value are set low, for the protection of the battery 24 from deterioration. As described above, in a region where the temperature of the battery 125 (hereinafter referred to as battery temperature) is high, the charge limit value is set low, for the protection of the battery 125 from deterioration. In order to increase regenerative torque of the motor generator 112 and thereby enhance the automatic brake performance, the vehicle controller 110 according to this example of the present invention temporarily extends the charge limit value that is set in consideration of the protection of the battery 125 from deterioration.

Figure 12:
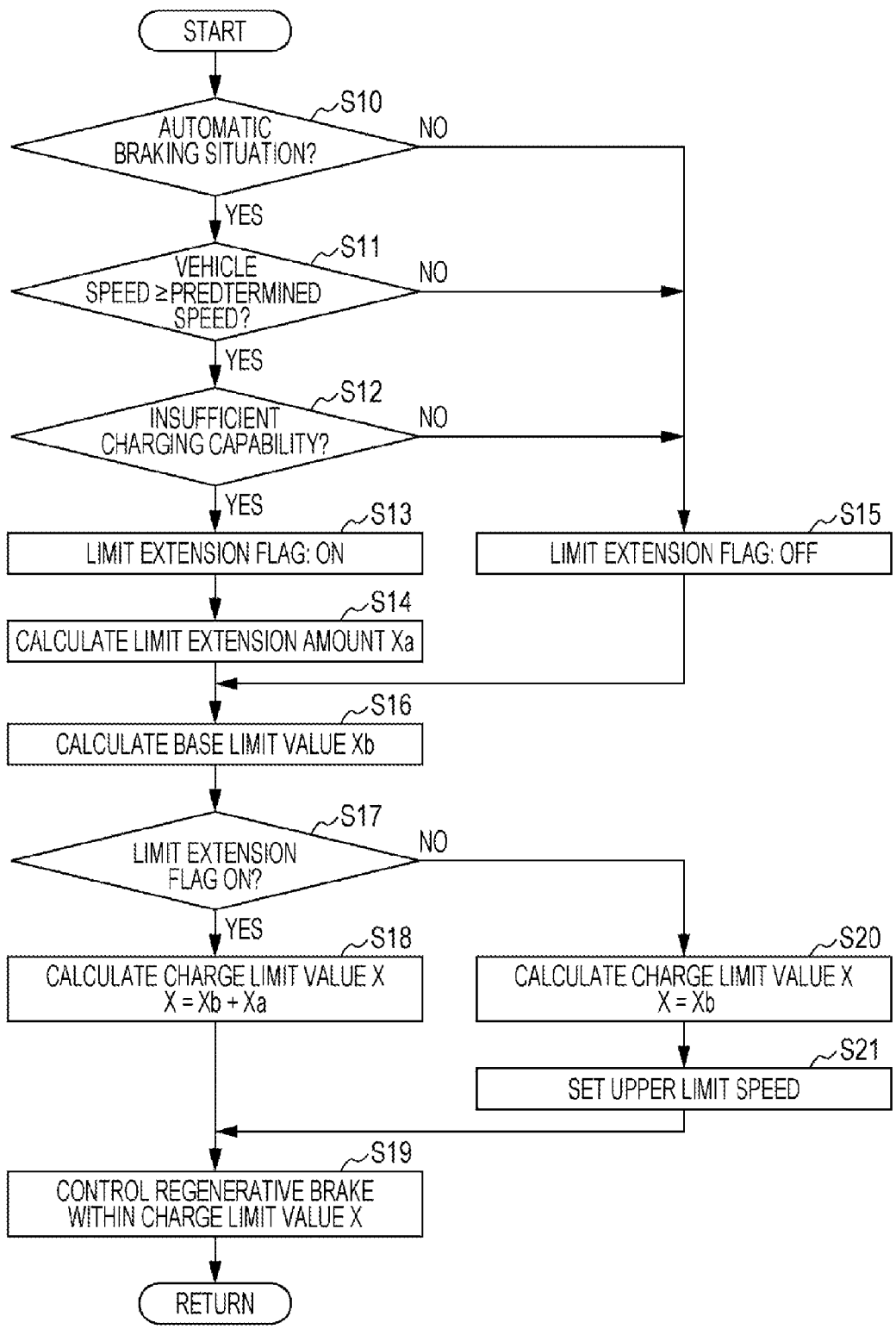
FIG. 12 is a flowchart illustrating a procedure for performing extension control for a charge limit value.

An extension control for the charge limit value in conjunction with the automatic brake control is described below. FIG. 12 is a flowchart illustrating a procedure for performing extension control for the charge limit value. On the basis of preceding-vehicle information, step S10 determines whether or not the automatic braking situation where the vehicle is approaching a preceding vehicle has occurred. If the automatic braking situation is determined to have occurred, the flow proceeds to step S11 to determine whether or not the vehicle speed is equal to or higher than a predetermined speed. If the vehicle speed is determined to be equal to or higher than the predetermined speed, the flow proceeds to step S12 to determine whether or not the charging capability of the battery 125 is insufficient. Step S12 determines whether or not the charge limit value of the battery 125 is insufficient to reach the target braking force for the regenerative brake 126 under automatic brake control. Next, a limit extension flag that permits extension of the charge limit value is set in step S13. Then in step S14, the amount of limit extension (extension amount) Xa for the charge limit value is calculated on the basis of battery temperature.

Figure 13:
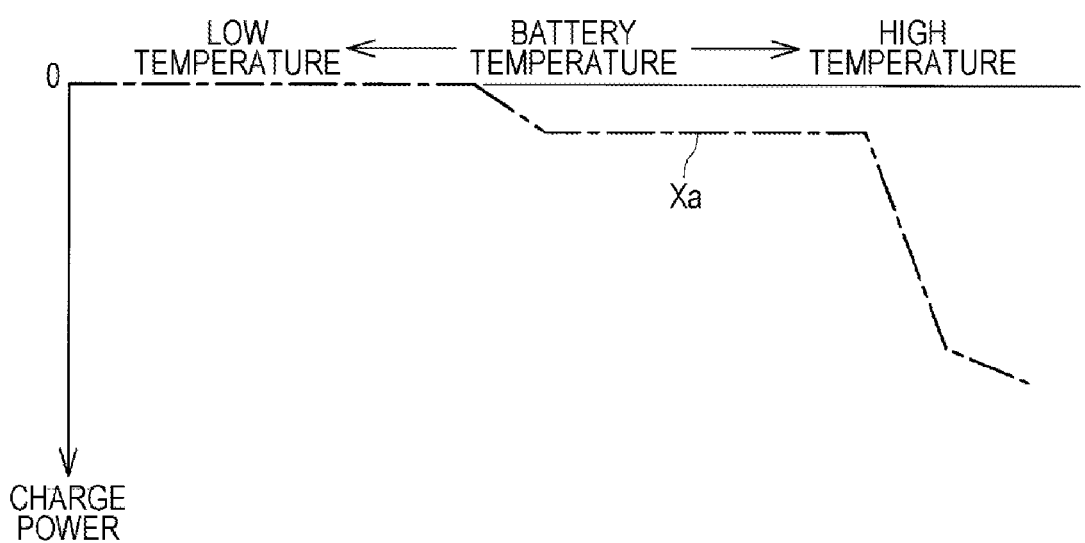
FIG. 13 is a schematic view illustrating an amount of limit extension.

FIG. 13 is a schematic view illustrating a limit extension amount Xa. The figure illustrates the limit extension amount Xa at a predetermined state of charge of the battery 125. As illustrated by a dashed-dotted line in FIG. 13, the limit extension amount Xa is set low when battery temperature is low, while the limit extension amount Xa is set high when battery temperature is high. That is, the limit extension amount Xa is set based on battery temperature. In contrast, if that the automatic braking situation is determined in step S10 not to have occurred, or if the charging capability of the battery 125 is determined in step S12 not to be insufficient, the flow proceeds to step S15 in which the set limit extension flag is cancelled. Then in step S16, a base limit value Xb that serves as the basis of the charge limit value is calculated on the basis of the temperature and state of charge of the battery 125. For instance, as illustrated in FIG. 11, if the state of charge of the battery 125 is S1 and battery temperature is T1, the base limit value Xb is set as the basis of the charge limit value.

Figure 14:
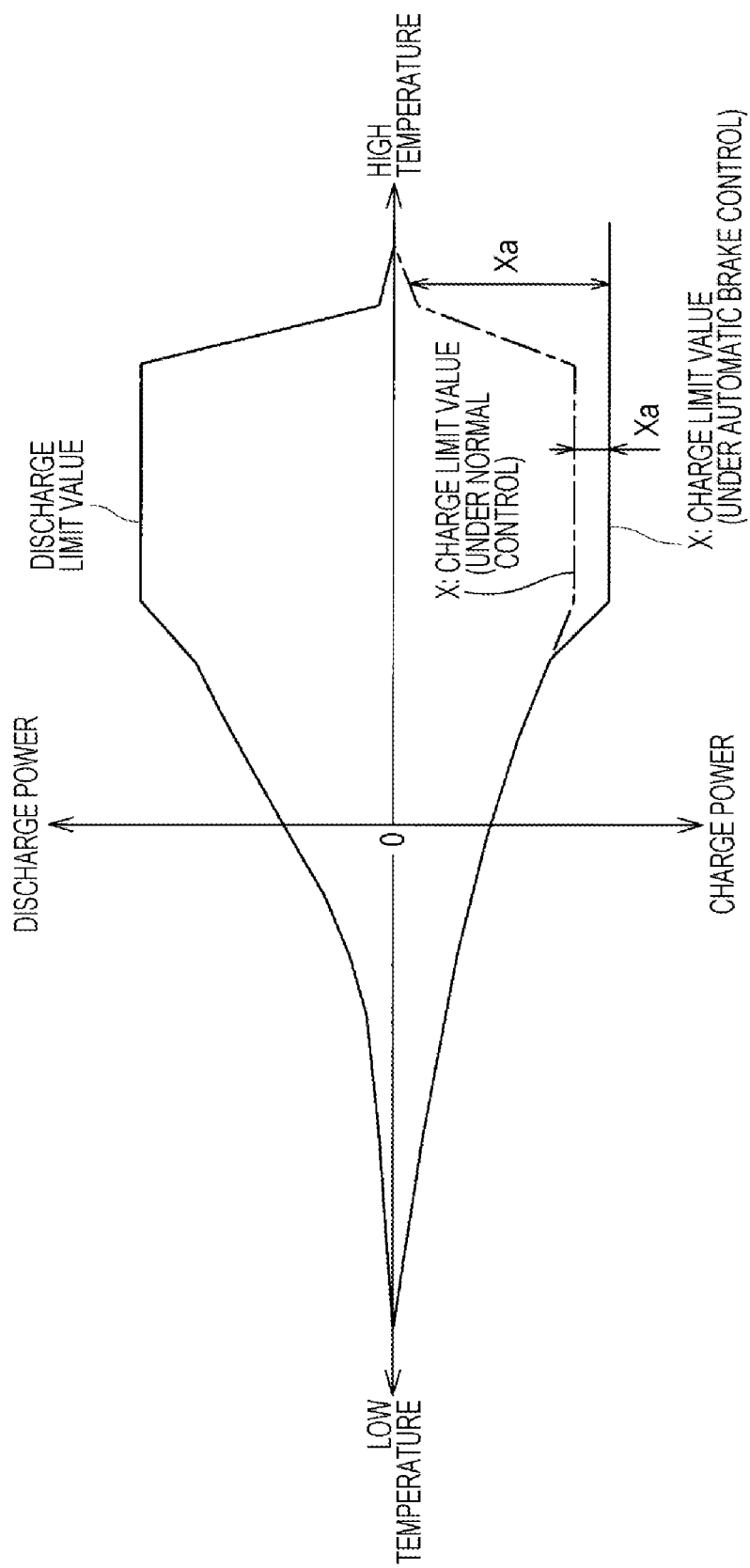
FIG. 14 is a schematic view illustrating a charge limit value to be extended under an automatic brake control.

Next, step S17 determines whether or not the limit extension flag is set. If that the extension flag is determined to be set, the flow proceeds to step S18 in which the charge limit value X is calculated by adding the limit extension amount Xa to the base limit value Xb. Then, the flow proceeds to step S19 in which the motor generator 112, namely, the regenerative brake 126 is controlled within the range of the extended charge limit value X. FIG. 14 is a schematic view illustrating a charge limit value X to be extended under automatic brake control. As illustrated by a solid line in FIG. 14, the charge limit value X is extended with the charge extension amount Xa. As described above, regenerative torque of the motor generator 112 can be increased by extending the charge limit value X under automatic brake control, thereby allowing automatic brake performance to be dramatically improved.

On the other hand, if the extension flag is determined in step S17 not to be set, the flow proceeds to step S20 in which the base limit value Xb is calculated as the charge limit value X without any change. Subsequent S21 sets an upper limit speed that is applicable to contraction of the charge limit value X. The charge limit value X, when contracted, is changed at speed not exceeding the upper limit speed. Next, the flow proceeds to step S19 in which the motor generator 112, namely, the regenerative brake 126 is controlled within the range of the charge limit value X. As described above, under normal control in which the automatic brake control is deactivated, deterioration in the battery 125 can be prevented by contracting the charge limit value X. The reason why the upper limit speed for the limit value is set in step S21 is that a rapid change in regenerative torque is prevented to keep stability. More specifically, when a significant level of regenerative torque is output from the motor generator 112, a rapid contraction of the charge limit value X may pose a risk of a steep decline in regenerative torque. Since such a steep decline in regenerative torque may degrade stability in vehicle traveling, the upper limit speed is set so as to ensure that the charge limit value X is gradually changed.

Figure 15:
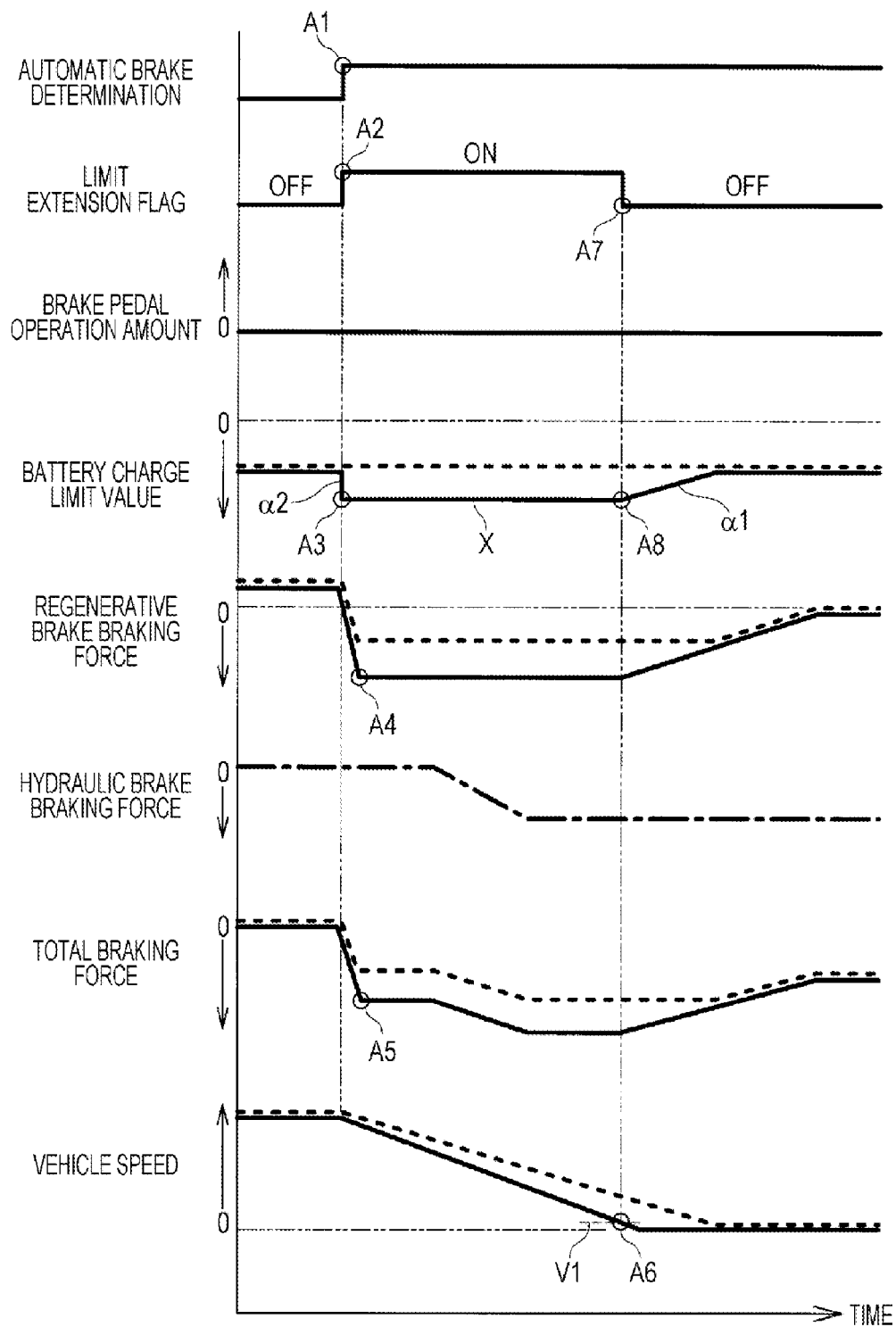
FIG. 15 is a timing chart illustrating the situation where an automatic brake control is performed by a control unit.

The situation where the automatic brake control is performed by the control unit 140 is described with reference to a timing chart. FIG. 15 is a timing chart illustrating a situation where the automatic brake control is performed by the control unit 140. In FIG. 15, a situation where the charge limit value X is extended is indicated by a solid line, while a situation where the charge limit value X is not extended is indicated by a dotted line. As illustrated in FIG. 15, if the automatic braking situation (A1) is determined, the limit extension flag (A2) is set to extend the charge limit value X of the battery 125 (A3). The charge limit value X thus extended provides increased braking force from the regenerative brake 126 (A4), thereby enabling a combined total braking force from the regenerative brake 126 plus the hydraulic brake 130 to be increased (A5). Extending the charge limit value X under automatic brake control in this manner increases the total braking force as well as accelerates an initial rise of the total braking force. This can enhance the braking capability given under automatic brake control, thereby allowing vehicle stability to be improved.

As illustrated in FIG. 15, if the vehicle speed falls below a predetermined speed V1 in conjunction with the automatic brake control (A6), the set limit extension flag is canceled (A7), starting contraction of the charge limit values X (A8). As illustrated by symbols α1 and α2 in FIG. 15, the rate of change in the contraction of the charge limit value X is set lower than the rate of change in the extension of the charge limit value X. In other words, since, as described above, the contraction of the charge limit value X is accompanied by the setting of the upper limit speed for changes to the limit value, the charge limit value X is configured to be gradually contracted. The gradual contraction of the charge limit value X places restrictions on a rapid change of regenerative torque even when a significant level of regenerative torque is output from the motor generator. This can avoid a rapid change of vehicle braking force, thereby allowing vehicle stability to be improved.

As described so far, the charge limit value is temporarily extended under automatic brake control. The performance of the battery 125 can be optimized by changing the control range of the battery 125 depending on the driving condition. In other words, under automatic brake control, extending the charge limit value on a temporary basis can increase regenerative torque while degradation in the battery 125 is minimized. This can enhance the braking capability given under automatic brake control, thereby allowing vehicle safety to be dramatically improved. In addition, the enhanced braking capability under automatic brake control can reduce the chances of the automatic brake control becoming activated, leading to improved vehicle safety. Furthermore, braking force of the regenerative brake 126 can be increased, eliminating the need for the hydraulic brake 130 becoming larger or high-performance.

Needless to say, the present invention is not limited to the foregoing example. Various modifications are conceivable within the scope of the present invention. In the example, setting of the limit extension amount Xa is based on battery temperature, but the present invention is not limited to this. Setting of the limit extension amount Xa may be based on battery temperature and other information. Also, the base limit value Xb is set based on battery temperature and state of charge, but the present invention is not limited to this. The base limit value Xb may be set based on the current, voltage, and other information of the battery 125. Furthermore, in the example, the battery 125 is used as a power storage device, but the present invention is not limited to this. A capacitor may be used as a power storage device.

In the example, object information on a preceding vehicle ahead of the vehicle is acquired with the camera unit 141. The camera unit 141 may be a stereo camera system provided with a plurality of cameras or a monocular camera provided with one camera. Alternatively, such object information may be acquired with a millimeter wave radar or infrared laser. Furthermore, combination of the camera unit 141, a millimeter wave radar, and an infrared laser may be used to acquire the object information. A preceding vehicle is used as an object ahead of the vehicle, but the present invention is not limited to this. A bicycle or pedestrian may be used as an object.

In the example, the automatic brake control is performed without the brake pedal 131 depressed by the driver, but the present invention is not limited to this. For instance, even when the brake pedal 131 is depressed by the driver, brake assist control may be performed as an automatic brake control that automatically brakes the wheels 122 if the control unit 140 determines the automatic braking situation. The power unit 113 illustrated is a series-parallel type power unit for a hybrid vehicle, but the present invention is not limited to this. The power unit 113 may be a series type power unit or a parallel type power unit for a hybrid vehicle or a power unit for an electric vehicle.

The invention claimed is:
1. A vehicle controller comprising:
an electric motor coupled to at least one wheel;
a power storage device connected to the electric motor;
a charge/discharge controller that controls the rate of charge/discharge of the power storage device;
a first traveling controller that controls the electric motor in accordance with a driver's operation; and a second traveling controller that controls the electric motor in accordance with a cruise function that automatically controls vehicle speed, wherein, when the first traveling controller controls the electric motor, the charge/discharge controller controls a rate of charge/discharge power of the power storage device within a first rate of charge/discharge range; and wherein, when the second traveling controller controls the electric motor, the charge/discharge controller controls a rate of charge/discharge power of the power storage device within a second rate of charge/discharge range that is wider than the first rate of charge/discharge range.

2. The vehicle controller according to claim 1, wherein the first rate of charge/discharge range is set according to a first discharge limit value and a first charge limit value; and wherein the second rate of charge/discharge range is set according to a second discharge limit value that is greater than the first discharge limit value on a discharge side and a second charge limit value that is greater than the first charge limit value on a charge side.

* * * * *